United States Patent
Kozuka et al.

(10) Patent No.: US 10,306,197 B2
(45) Date of Patent: May 28, 2019

(54) REPRODUCTION METHOD AND REPRODUCTION APPARATUS

(71) Applicant: PANASONIC INTELLECTUAL PROPERTY MANAGEMENT CO., LTD., Osaka (JP)

(72) Inventors: Masayuki Kozuka, Osaka (JP); Takahiro Nishi, Nara (JP); Kengo Terada, Osaka (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 15/610,991

(22) Filed: Jun. 1, 2017

(65) Prior Publication Data
US 2017/0272719 A1    Sep. 21, 2017

Related U.S. Application Data

(63) Continuation of application No. 15/226,136, filed on Aug. 2, 2016, now Pat. No. 9,794,539, which is a
(Continued)

(30) Foreign Application Priority Data

Aug. 21, 2015  (JP) ................. 2015-164095

(51) Int. Cl.
*H04N 9/64* (2006.01)
*G09G 5/00* (2006.01)
(Continued)

(52) U.S. Cl.
CPC ............ *H04N 9/646* (2013.01); *G06T 5/007* (2013.01); *G09G 5/00* (2013.01); *G09G 5/10* (2013.01);
(Continued)

(58) Field of Classification Search
CPC .......... H04N 9/646; H04N 5/202; H04N 9/87; G06T 5/07; G09G 5/00; G09G 5/10
See application file for complete search history.

(56) References Cited

U.S. PATENT DOCUMENTS 6,407,746 B1   6/2002  Tanizawa
8,098,931 B2   1/2012  Chen
(Continued)

FOREIGN PATENT DOCUMENTS

JP   2008-167418   7/2008

OTHER PUBLICATIONS

Cotton et al., "BBC's response to CfE for HDR Video Coding (Category 3a)", 112. MPEG Meeting; Jun. 22, 2015 to Jun. 26, 2015; Warsaw; (Motion Picture Expert Group or ISO/IEC JTC1/SC29/WG11), No. m36249, (Jun. 18, 2015), XP030064617.
(Continued)

*Primary Examiner* — Mishawn N Hunter
(74) *Attorney, Agent, or Firm* — Greenblum & Bernstein, P.L.C.

(57) ABSTRACT

In a reproduction method, a first video stream has a first dynamic range where a maximum value of a luminance dynamic range is more than 100 nits, and a display apparatus displays video in a second dynamic range narrower than the first dynamic range. The method determines whether the first video stream is quantized based on a hybrid OETF. When it is determined that the first video stream is quantized based on the hybrid OETF, the first video stream is reproduced. When it is determined that the first video stream is not quantized based on the hybrid OETF, a luminance dynamic range of the first video stream is converted from the first dynamic range to the second dynamic range to obtain a second video stream, and the second video stream is reproduced.

4 Claims, 19 Drawing Sheets

Related U.S. Application Data continuation of application No. PCT/JP2015/004658, filed on Sep. 14, 2015.

(60) Provisional application No. 62/053,508, filed on Sep. 22, 2014.

(51) Int. Cl.
| | |
|---|---|
| *G09G 5/10* | (2006.01) |
| *H04N 21/431* | (2011.01) |
| *H04N 9/87* | (2006.01) |
| *H04N 11/24* | (2006.01) |
| *H04N 21/234* | (2011.01) |
| *G06T 5/00* | (2006.01) |
| *H04N 21/435* | (2011.01) |
| *H04N 21/45* | (2011.01) |
| *G11B 27/00* | (2006.01) |
| *H04N 5/202* | (2006.01) |
| *H04N 21/4363* | (2011.01) |
| *H04N 21/4402* | (2011.01) |

(52) U.S. Cl.
CPC ............ *G11B 27/00* (2013.01); *H04N 5/202* (2013.01); *H04N 9/87* (2013.01); *H04N 11/002* (2013.01); *H04N 21/234* (2013.01); *H04N 21/431* (2013.01); *H04N 21/435* (2013.01); *H04N 21/4318* (2013.01); *H04N 21/43635* (2013.01); *H04N 21/4402* (2013.01); *H04N 21/4516* (2013.01); *G09G 2320/0673* (2013.01); *G09G 2340/06* (2013.01)

(56) References Cited

U.S. PATENT DOCUMENTS

| | | |
|---|---|---|
| 2009/0027558 A1 | 1/2009 | Mantiuk et al. |
| 2009/0284554 A1 | 11/2009 | Doser |
| 2010/0128057 A1 | 5/2010 | Doser et al. |
| 2010/0265264 A1 | 10/2010 | Doser et al. |
| 2011/0188744 A1* | 8/2011 | Sun .................. G06T 5/50 382/162 |
| 2011/0194618 A1 | 8/2011 | Gish et al. |
| 2013/0148029 A1 | 6/2013 | Gish et al. |
| 2014/0210847 A1* | 7/2014 | Knibbeler .......... G09G 5/006 345/589 |
| 2015/0103919 A1* | 4/2015 | Hattori .............. H04N 19/124 375/240.25 |
| 2015/0245050 A1 | 8/2015 | Tourapis et al. |

OTHER PUBLICATIONS

Summons to attend oral proceedings pursuant to Rule 115(1) EPC from European Patent Office (EPO) dated Feb. 27, 2019 for European Patent Application No. 15844490.1.

Whp 283 ET AL: "Research & Development White Paper Non-linear Opto-Electrical Transfer Functions for High Dynamic Range Teievision", Jul. 30, 2014, XP055373120, Retrieved from the Internet: URL:http://downloads.bbc.co.uk/rd/pubs/whp/whp-pdf-files/WHP283pdf [retrieved on May 16, 2017].

* cited by examiner

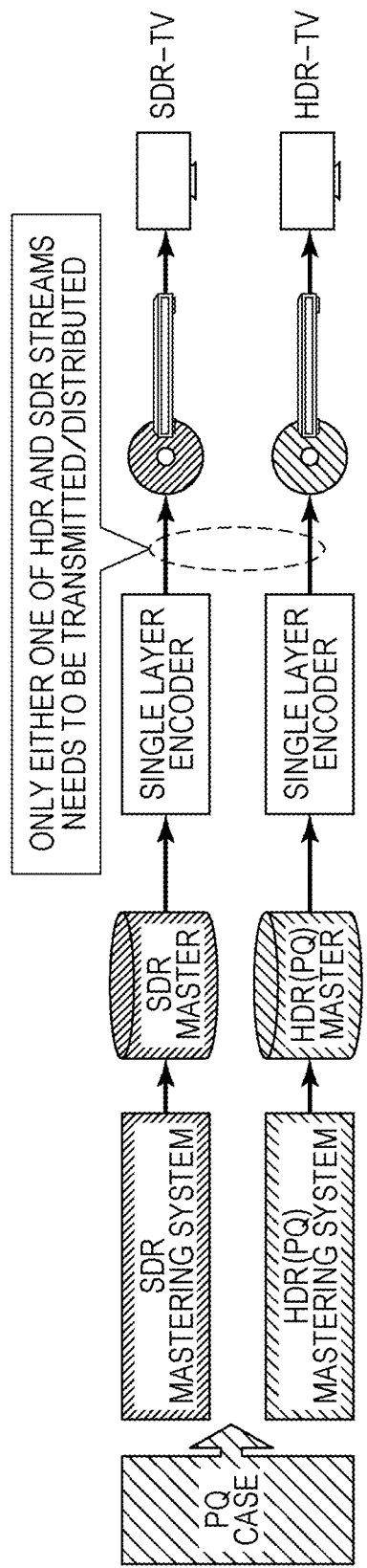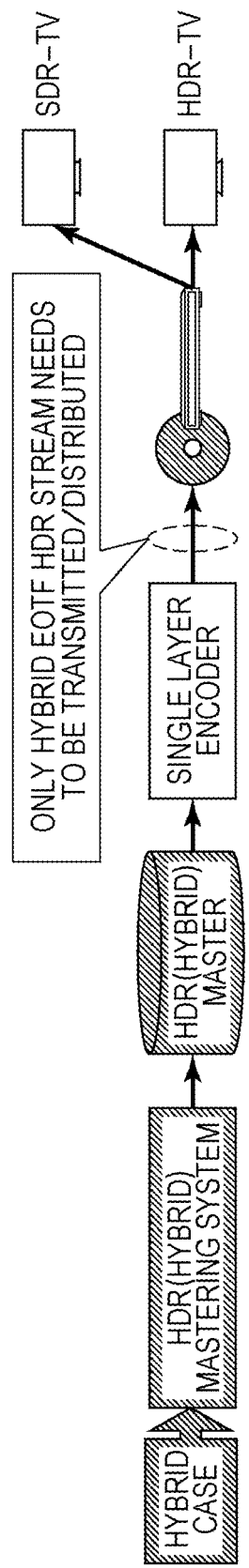

FIG. 14

| HDR MASTER SPEC | | MANDATORY PART |
|---|---|---|
| COLOR SPACE | | YCbCr BT.2020 (NON CONSTANT LUMINANCE) |
| BITS | | 10bits |
| EOTF | | SMPTE 2084 EOTF (10bits) |
| PEAK LUMINANCE | | TBD |
| META DATA | MAX/MIN LUMINANCE (STATIC) | MASTERING DISPLAY COLOR VOLUME SEI MESSAGE OF HEVC (MPEG ADOPTION OF SMPTE 2086 CARRIAGE), TITLE BY TITLE |
| | COLOR VOLUME MAPPING (DYNAMIC) | TBD |

FIG. 16

| HDR MASTER SPEC | | MANDATORY PART |
|---|---|---|
| COLOR SPACE | | YCbCr BT.2020 (NON CONSTANT LUMINANCE) |
| BITS | | 10bits |
| EOTF | | SMPTE 2084 EOTF (10bits) AND HYBRID (BBC (Lmax8)) |
| PEAK LUMINANCE | | 1000nit (STUDY FOR PQ: 4000nit AS OPTION) |
| META DATA | MAX/MIN LUMINANCE (STATIC) | MASTERING DISPLAY COLOR VOLUME SEI MESSAGE OF HEVC (MPEG ADOPTION OF SMPTE 2086 CARRIAGE), AND CONTENT PEAK LUMINANCE |
| | COLOR VOLUME MAPPING (DYNAMIC) | NO MANDATORY/OPTION (TBD) |

REPRODUCTION METHOD AND REPRODUCTION APPARATUS

CROSS-REFERENCE TO RELATED APPLICATION

This is a continuation application of U.S. patent application Ser. No. 15/226,136, filed Aug. 2, 2016, which is a continuation of International Patent Application No. PCT/JP2015/004658, filed Sep. 14, 2015, which claims the benefit of U.S. Provisional Patent Application No. 62/053,508, filed Sep. 22, 2014, and priority to Japanese Application No. 2015-164095, filed Aug. 21, 2015. The disclosures of these documents, including the specifications, drawings, and claims, are incorporated herein by reference in their entirety.

BACKGROUND

1. Technical Field

The present disclosure relates to a reproduction method and a reproduction apparatus.

2. Description of the Related Art

Conventionally, there is disclosed an image signal processing apparatus for improving displayable luminance levels (see, for example, Unexamined Japanese Patent Publication No. 2008-167418).

SUMMARY

In one general aspect, the techniques disclosed here feature a reproduction method including: determining whether a first video stream is quantized based on a hybrid OETF, the first video stream has a first dynamic range where a maximum value of a luminance dynamic range is more than 100 nits; (i) when it is determined that the first video stream is quantized based on the hybrid OETF, obtaining a first reproduction signal by reproducing the first video stream, and outputting the first reproduction signal to a display apparatus, the display apparatus displays video in a second dynamic range narrower than the first dynamic range; and (ii) when it is determined that the first video stream is not quantized based on the hybrid OETF, converting a luminance dynamic range of the first video stream from the first dynamic range to the second dynamic range to obtain a second video stream; obtaining a second reproduction signal by reproducing the second video stream, and outputting the second reproduction signal to the display apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 6A is a diagram for describing a case of transmitting/distributing an HDR stream where luminance values are quantized using a PQ OETF, to an HDRTV and an SDRTV;

FIG. 6B is a diagram for describing a case of transmitting/distributing an HDR stream where luminance values are quantized using a hybrid OETF, to the HDRTV and the SDRTV;

FIG. 14 is a diagram showing a table showing an example of HDR master specifications (mandatory part);

FIG. 16 is a diagram showing a table showing HDR master specifications (mandatory part) proposed by the present inventors;

Figure 1:
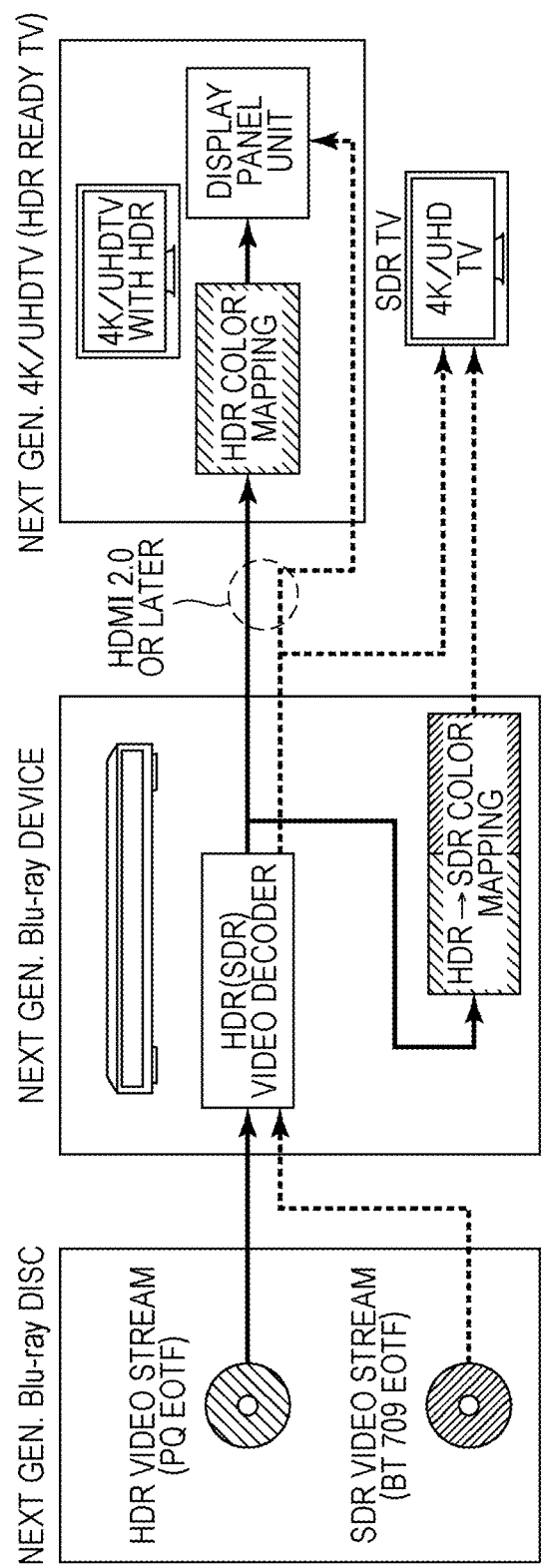
FIG. 1 is a schematic diagram showing content of processes performed by a Blu-ray (registered trademark; hereinafter, the same) device in a manner appropriate to various types of BDs and various types of display apparatuses.

DETAILED DESCRIPTION (Findings Forming a Basis of the Present Disclosure)

The present inventors have found that the image signal processing apparatus described in the "BACKGROUND ART" section has following problems.

So far, for achievement of high image quality of video, attention has been primarily focused on an increase in a number of pixels, and 1920×1080 pixel video called Full HD (FHD: Full High Definition) or 2048×1080 pixel video has spread. In recent years, with the aim of achieving higher image quality of video, introduction of so-called 4K video such as 3840×1920 pixels or 4096×1920 pixels has started. Moreover, it is considered to achieve high image quality of video by achieving a high resolution of video and, for example, increasing dynamic range or color space or improving frame rate.

Above all, for the dynamic range, HDR (High Dynamic Range) is receiving attention as a scheme that supports a luminance dynamic range where a maximum luminance value is increased to represent bright light such as specular reflected light that cannot be represented by current TV signals, in brightness closer to real brightness, while dark-part gradations in conventional video are maintained. Specifically, a dynamic range scheme supported by conventional TV signals is called SDR (Standard Dynamic Range) and has a maximum luminance value of 100 nits; on the other hand, in HDR a maximum luminance value is assumed to increase up to 1000 nits or more. Standardization of HDR by SMPTE (Society of Motion Picture & Television Engineers), ITU-R (International Telecommunications Union Radiocommunications Sector), etc., is in progress. Specific applications of HDR are assumed to include broadcasts, BDs (Blu-ray Discs), etc.

In Blu-ray, an HDR scheme that uses a Perceptual Quantizer (PQ) EOTF (also referred to as "PQ curve" or "SMPTE 2084") as an EOTF (Electro-Optical Transfer Function) has problems shown below. Note that the EOTF will be described later.

First, since a standard scheme for HDR-to-SDR conversion techniques has not been established, Blu-ray device manufacturers implement the conversion by their own schemes. Hence, there is a problem that it is difficult for a content creator to check video obtained after HDR-to-SDR conversion on an SDR-compatible TV (hereinafter, referred to as "SDRTV"), and thus it is difficult to include content creator's intent (director's intent) in the SDR-converted video.

To solve this problem, a film company needs to prepare in advance video streams that support both HDR and SDR, and to include both of the video streams on one disc (e.g., a BD) or include, in one package, a BD on which is recorded the video stream that supports SDR (hereinafter, referred to as "SDR stream") and a BD on which is recorded the video stream that supports HDR (hereinafter, referred to as "HDR stream"), by which the BD(s) is sold. In addition, in a case of Internet distribution (OTT Over the Top), there is a need to prepare both an SDR stream and an HDR stream on a network server.

On the other hand, a user needs to consciously select whether a TV to be used is an HDR-compatible TV (hereinafter, referred to as "HDRTV") and whether a BD (or content, a service, etc.) to be played is an HDR-supporting BD (an HDR service in a case of OTT). That is, the user needs to check whether a TV owned by him/her is the HDRTV. If the TV is the current SDRTV, unless the user selects a BD on which an SDR stream is recorded or selects an SDR stream, appropriate display is not performed, and thus, the user cannot view content. By this, there is a risk of receiving complaints from the user. In addition, in a case in which an SDR stream and an HDR stream are separately included on two BDs, respectively, when an SDRTV user plays the BD including the HDR stream, video turns out to be faded, which may result in the user misunderstanding that his/her TV or Blu-ray device is broken.

The HDR scheme using only the PQ EOTF which is considered in Blu-ray has the above-described problems. Hence, by adding an EOTF (hereinafter, referred to as "hybrid EOTF") that is based on EOTF technology compatible with a BT.709 gamma curve (EOTF that supports SDR), for a dark part (low-luminance area) so that both EOTFs can be used, the problems are to be solved.

Specifically, the present inventors have considered following improvement strategies to solve the above-described problems.

A reproduction method according to one aspect of the present disclosure is a reproduction method including: determining whether a first video stream is quantized based on a hybrid OETF, the first video stream has a first dynamic range where a maximum value of a luminance dynamic range is more than 100 nits; (i) when it is determined that the first video stream is quantized based on the hybrid OETF, obtaining a first reproduction signal by reproducing the first video stream, and outputting the first reproduction signal to a display apparatus, the display apparatus displays video in a second dynamic range narrower than the first dynamic range; and (ii) when it is determined that the first video stream is not quantized based on the hybrid OETF, converting a luminance dynamic range of the first video stream from the first dynamic range to the second dynamic range to obtain a second video stream; obtaining a second reproduction signal by reproducing the second video stream, and outputting the second reproduction signal to the display apparatus.

According to this, video can be appropriately displayed on the display apparatus.

In addition, for example, the hybrid OETF may be an OETF that supports the first dynamic range and that is compatible with an OETF that supports the second dynamic range in a low-luminance area.

In addition, for example, when the video stream is not quantized based on the hybrid OETF, the video stream may be quantized using an SMPTE 2084 OETF.

In addition, for example, the video stream may include information indicating whether the video stream is quantized based on the hybrid OETF.

In addition, for example, when the video stream is quantized based on the hybrid OETF, the video stream may include, as static metadata, information provided by mastering display color volume SEI message, and peak luminance information indicating a peak luminance of content provided by the video stream.

In addition, for example, the peak luminance of content may be 1000 nits.

In addition, for example, the first reproduction signal may be obtained without performing a process of converting the luminance dynamic range of the first video stream from the first dynamic range to the second dynamic range.

Note that these general comprehensive or specific aspects may be implemented by an apparatus, a system, an integrated circuit, a computer program, or a recording medium such as a computer-readable CD-ROM, or may be implemented by any combination of an apparatus, a system, an integrated circuit, a computer program, and a recording medium.

By implementing the above-described improvement strategies, when a content creator (studio) adopts an inverse function of a hybrid EOTF (OETF: Optical-Electro Transfer Function) for generation of an HDR stream, the content creator (studio) can determine beforehand display content on an SDRTV and thus can check beforehand image quality for when the HDR stream is viewed on the SDRTV. Hence, when the studio has confirmed that display content for when the SDRTV displays an HDR stream generated using the hybrid OETF is excellent, the hybrid OETF may be used.

In addition, when the studio determines that the display content on the SDRTV for when the hybrid OETF is adopted is not satisfactory, the studio may provide a service using a combination of an HDR stream generated by an HDR scheme that uses a PQ curve and an SDR stream, by which content creator's intent (director's intent) may be reflected.

When a film company is satisfied with an SDRTV image created using the hybrid OETF, the film company needs to prepare only an HDR stream generated using the hybrid OETF, eliminating the need to prepare both an HDR stream and an SDR stream. In addition, in this case, a user does not need to consciously select an HDRTV, a BD that supports HDR, an OTT service that supports HDR, etc.

FIG. 1 is a schematic diagram showing an example of content of processes performed by a Blu-ray device in a manner appropriate to various types of BDs and various types of display apparatuses.

As shown in FIG. 1, BDs (next generation BDs) include a first BD on which is recorded an HDR stream where luminance values of video are quantized using a PQ OETF (also referred to as "Optical-Electro Transfer Function"); and a second BD on which is recorded an SDR stream where luminance values of video are quantized using a BT.709 OETF. Note that a BD on which is recorded an SDR stream where luminance values of video are quantized using a BT.1886 OETF (also referred to as "2.4 gamma curve") may be used as the second BD.

A case in which the first BD is played on the Blu-ray device (next generation Blu-ray device) will be described. Note that in FIG. 1 and subsequent drawings a flow of a process for the HDR stream is represented by a solid arrow, and a flow of a process for the SDR stream is represented by a dotted arrow.

When the Blu-ray device is connected to an HDRTV (HDR Ready TV) compatible with display that supports an HDR stream (hereinafter, referred to as "HDR display") by an HDMI (registered trademark; hereinafter, the same) 2.0 or later communication interface, the HDR stream recorded on the first BD is decoded by a video decoder (HDR (SDR) Video Decoder) of the Blu-ray device. A video signal obtained by the decoding is output to the HDRTV through the HDMI. The HDRTV performs HDR color mapping on the video signal received through the HDMI and outputs the video signal to a display panel, by which video is displayed on the display panel.

When the Blu-ray device is connected to an SDRTV, the HDR stream recorded on the first BD is decoded by the video decoder of the Blu-ray device. A color mapping process from HDR to SDR (also referred to as "luminance conversion process" or "remapping") is performed on a video signal obtained by the decoding, by which the video signal is converted to an SDR video signal. The converted SDR video signal is output to the SDRTV through a communication interface such as HDMI. The SDRTV displays video that is created based on the video signal received through the HDMI, on a display panel.

Next, a case in which the second BD is played on the Blu-ray device will be described.

When the Blu-ray device is connected to the HDRTV by the HDMI 2.0 or later communication interface, the SDR stream recorded on the second BD is decoded by the video decoder of the Blu-ray device. A video signal obtained by the decoding is output to the HDRTV through the HDMI. The HDRTV outputs the video signal received through the HDMI to the display panel without performing HDR color mapping on the video signal, by which video is displayed on the display panel. Note that when the video signal is output to the SDRTV, too, substantially the same processes as the processes described above are performed.

Figure 2:
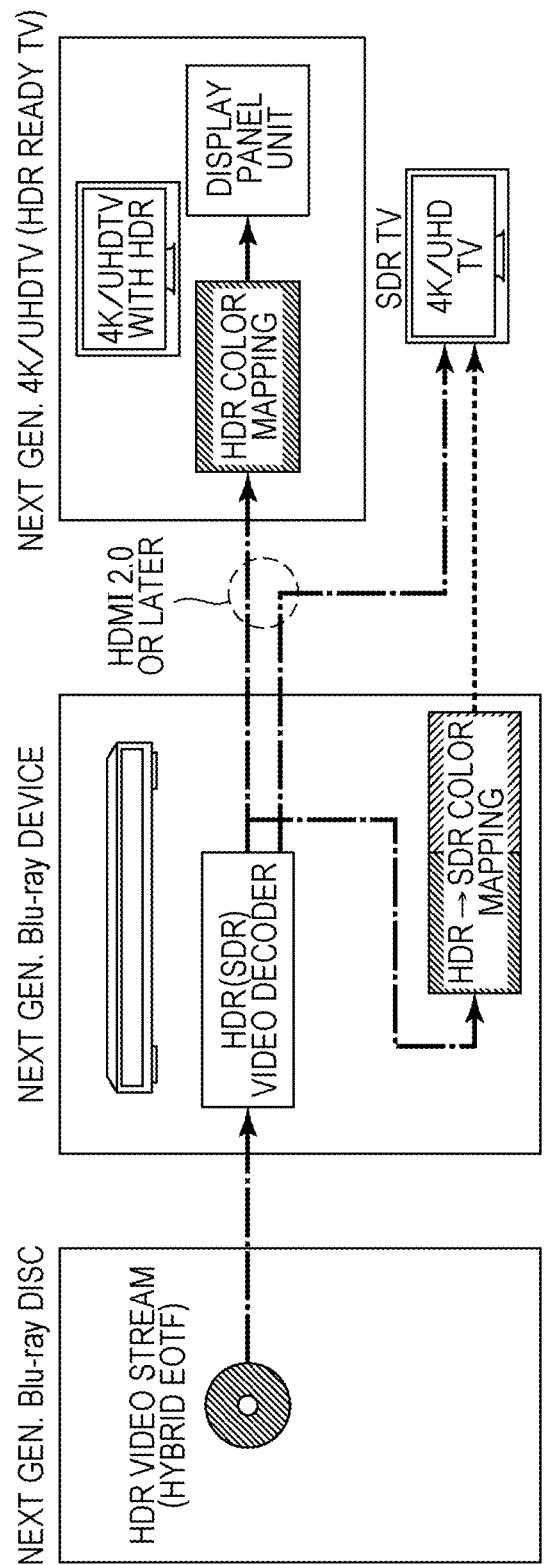
FIG. 2 is a schematic diagram showing content of processes performed when the Blu-ray device plays a BD on which is recorded an HDR stream that supports a hybrid EOTF.

FIG. 2 is a schematic diagram showing content of processes performed when the Blu-ray device plays a BD on which is recorded an HDR stream generated using a hybrid OETF.

As shown in FIG. 2, the BD in this case is a third BD on which is recorded an HDR stream where luminance values of video are quantized using a hybrid OETF.

A case in which the third BD is played on the Blu-ray device will be described. In addition, in FIG. 2 and subsequent drawings, a flow of a process for the HDR stream generated using the hybrid OETF (hereinafter, also referred to as "hybrid stream") is represented by a dash-dotted arrow.

When the Blu-ray device is connected to the HDRTV by the HDMI 2.0 or later communication interface, the HDR stream recorded on the third BD is decoded by the video decoder of the Blu-ray device. A video signal obtained by the decoding is output to the HDRTV as an HDR-supporting video signal through the HDMI. The HDRTV performs HDR color mapping on the video signal received through the HDMI and outputs the video signal to the display panel, by which video is displayed on the display panel.

When the Blu-ray device is connected to the SDRTV, the HDR stream recorded on the third BD is decoded by the video decoder of the Blu-ray device. A video signal obtained by the decoding is output as an SDR-supporting video signal to the SDRTV through the HDMI. The SDRTV displays video that is created based on the video signal received through the HDMI, on the display panel.

Note that when the Blu-ray device is connected to the SDRTV, a color mapping process from HDR to SDR may be performed on the video signal obtained by the decoding, by which the video signal may be converted (luminance conversion) to an SDR video signal. The converted SDR video signal is output to the SDRTV through a communication interface such as HDMI. The SDRTV displays video that is created based on the video signal received through the HDMI, on the display panel.

Next, an overview of a hybrid EOTF will be described with reference to FIGS. 3 to 6.

Figure 3:
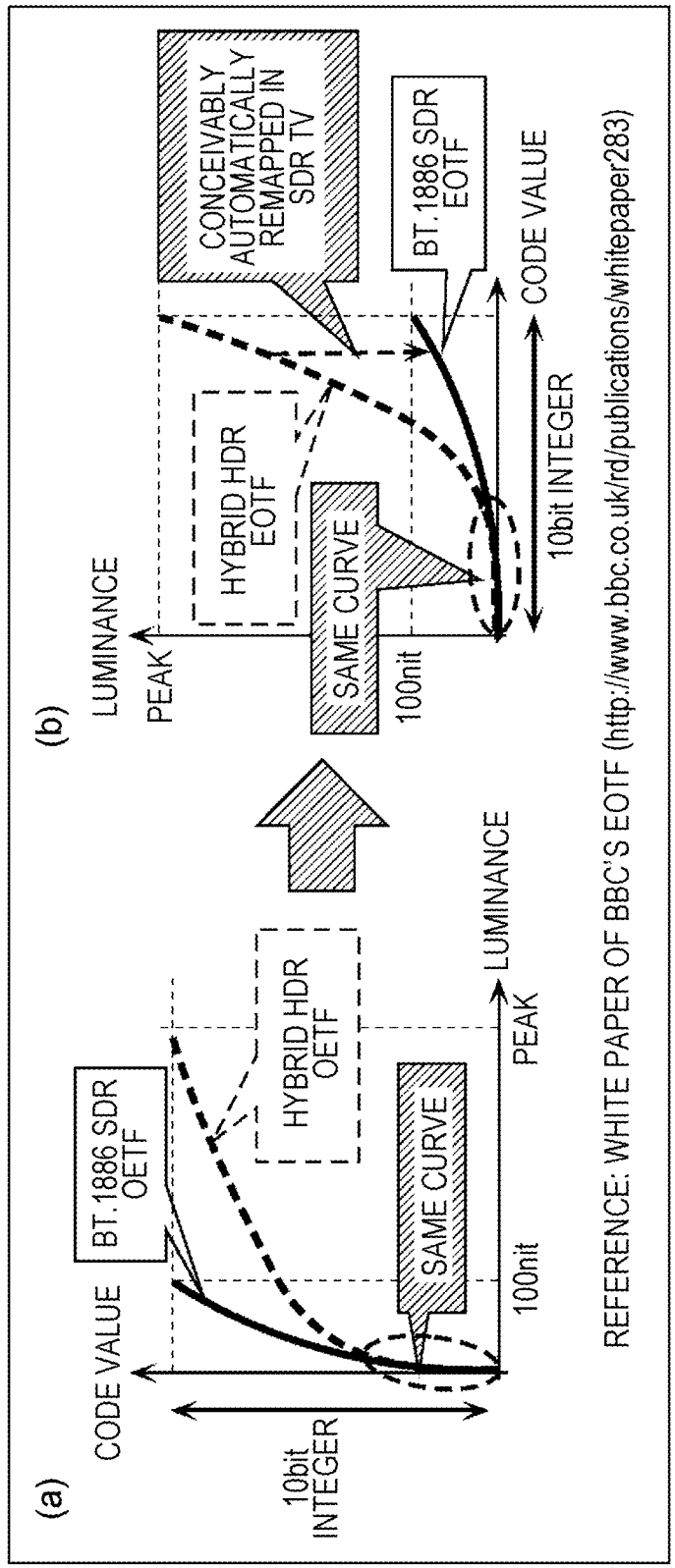
FIG. 3 is a diagram for describing an overview of a hybrid OETF and a hybrid EOTF.
Figure 4:
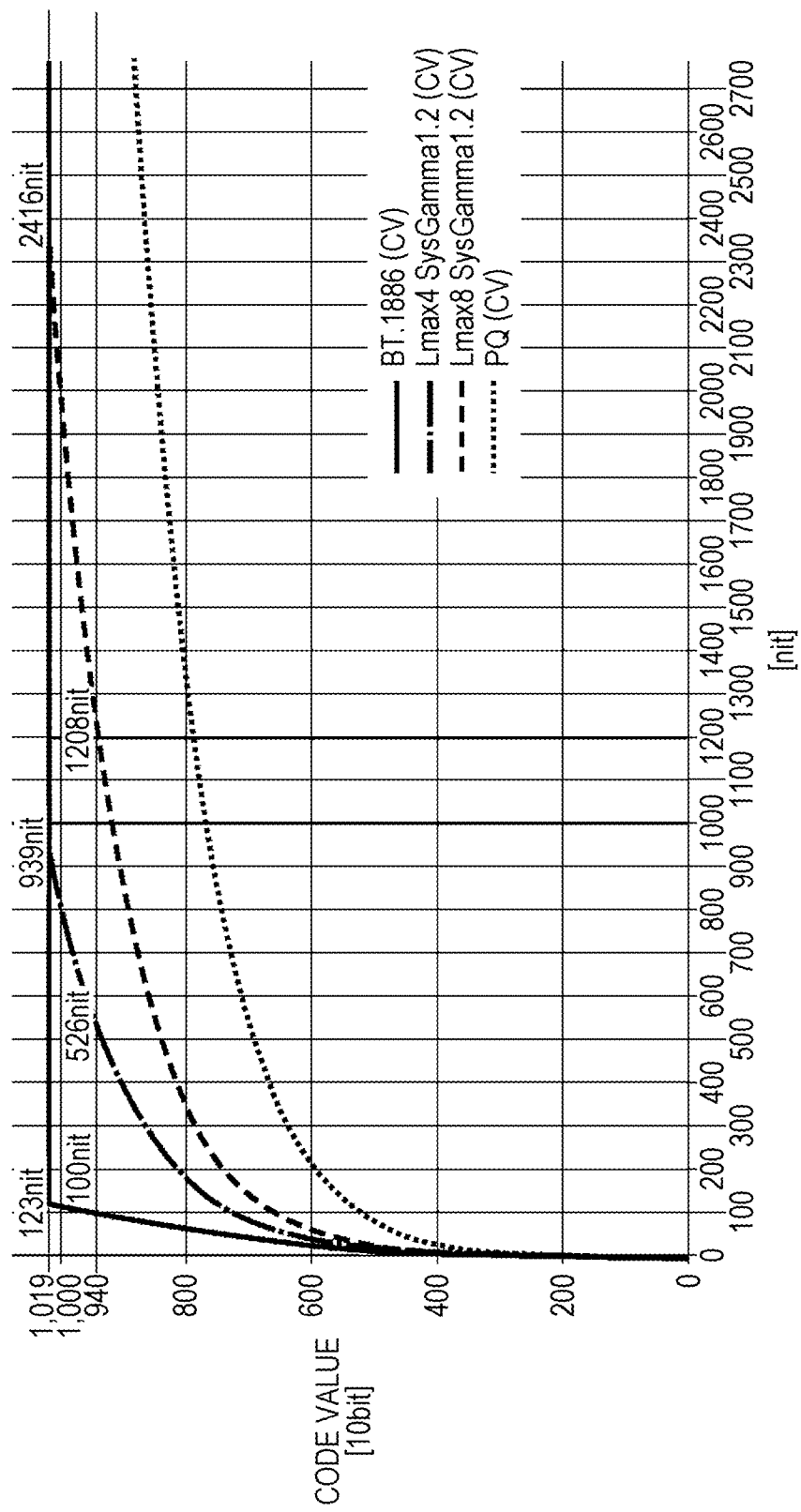
FIG. 4 is a diagram for comparing OETFs.
Figure 5:
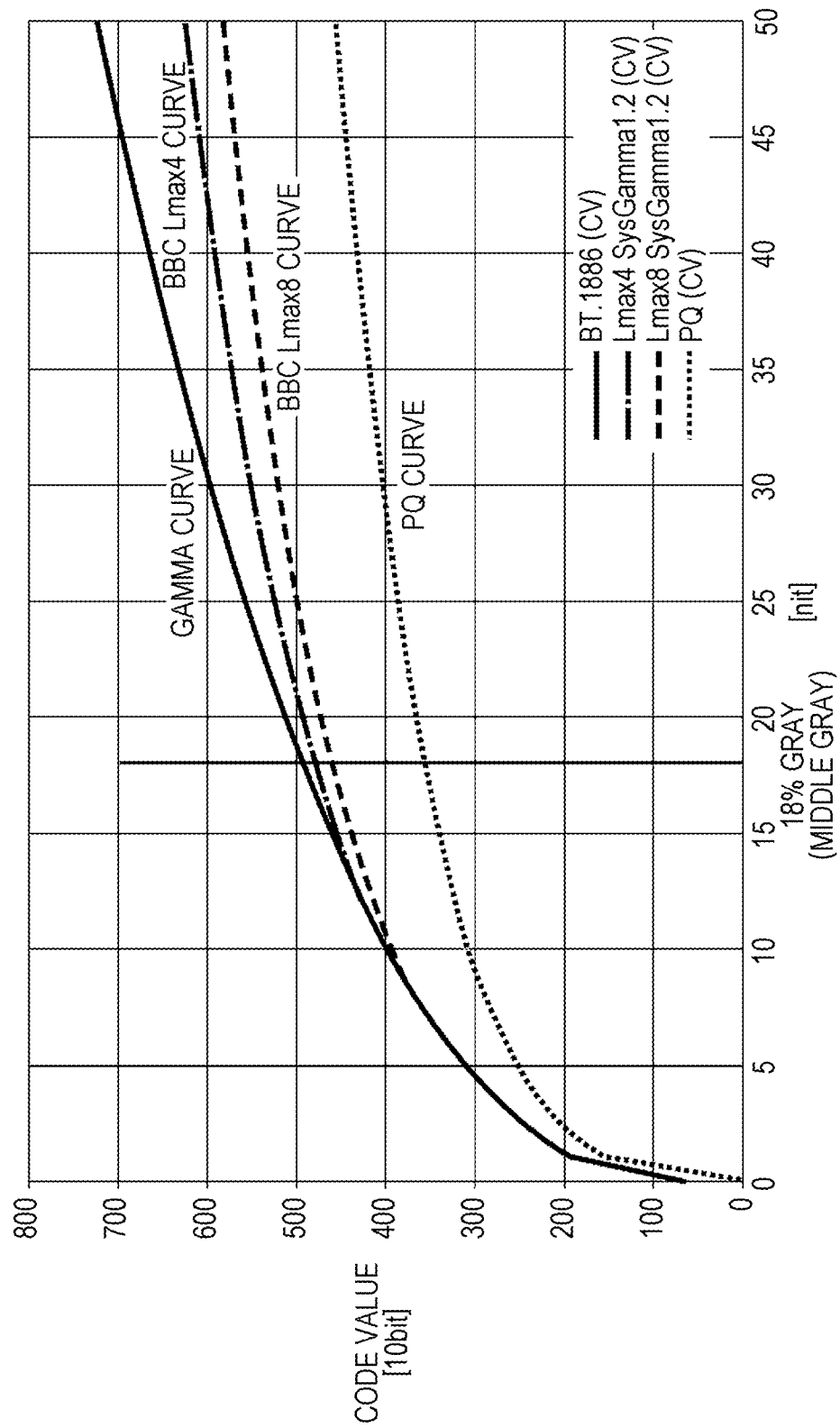
FIG. 5 is a diagram showing a dark-part area (low-luminance area) of FIG. 4 in an enlarged manner.

FIG. 3 is a diagram for describing an overview of a hybrid OETF and a hybrid EOTF. FIG. 4 is a diagram for comparing OETFs. FIG. 5 is a diagram showing a dark-part area (low-luminance area) of FIG. 4 in an enlarged manner.

First, an EOTF will be described. The EOTF is generally called a gamma curve. The EOTF represents a correspondence between a luminance value and a code value, and is to quantize a luminance value and convert the luminance value to a code value. That is, the EOTF is relationship information indicating a correspondence relationship between luminance values and a plurality of code values. For example, when luminance values of video that supports SDR are represented by 10-bit gradation code values, luminance values in a luminance range of up to 100 nits are quantized and mapped to 1024 integer values ranging from 0 to 1023. That is, by performing quantization based on the EOTF, the luminance values in the luminance range of up to 100 nits (the luminance values of the video that supports SDR) are converted to an SDR signal having 10-bit code values. An EOTF that supports HDR (hereinafter, referred to as "HDR EOTF") can represent higher luminance values than luminance values represented by an EOTF that supports SDR (hereinafter, referred to as "SDR EOTF"), and for example, in FIG. 3, a maximum luminance value (peak luminance) is 1000 nits. That is, an HDR luminance range includes an entire SDR luminance range, and an HDR peak luminance is higher than an SDR peak luminance. The HDR luminance range is a luminance range where a maximum value is increased to 1000 nits from, for example, 100 nits which is a maximum value of the SDR luminance range. In addition, an HDR signal is also represented by, for example, 10-bits gradations.

The OETF is an inverse function of the EOTF. That is, if an opposite relationship of the EOTF is used, it means that the OETF is used. Thus, in the following, quantization of luminance values of video using the OETF is also referred to as quantization of luminance values of video using the EOTF in a same sense.

Video after grading is quantized using an OETF shown in (a) of FIG. 3, by which code values corresponding to luminance values of the video are determined. Image encoding, etc., are performed based on the code values, by which an elementary stream is generated. In addition, upon reproduction, decoding results of the elementary stream are dequantized based on an EOTF shown in (b) of FIG. 3, by which a luminance value for each pixel is restored. Note that in a case of FIG. 3, in generation of an SDR stream, quantization is performed by using a BT.1886 OETF, and in reproduction of the SDR stream, luminance values are restored by using a BT.1886 EOTF. Note also that in generation of an HDR stream, quantization is performed by using a hybrid OETF, and in reproduction of the HDR stream, luminance values are restored by using a hybrid EOTF. Note that although in the case of FIG. 3 the generation and reproduction of an HDR stream use the hybrid OETF and the hybrid EOTF, respectively, a PQ OETF and a PQ EOTF may be used.

The hybrid EOTF is, for example, an HDR EOTF compatible with the SDRTV, which is proposed by BBC (British Broadcasting Corporation) to the ITU-R. The HDR EOTF compatible with the SDRTV is an EOTF that allows to restore luminance values of video in an HDR luminance range when the video is displayed on the HDRTV, and allows to restore luminance values of video in an SDR luminance range when the video is displayed on the SDRTV.

Specifically, in the hybrid OETF which is an inverse function of the hybrid EOTF, a dark-part area (low-luminance area) is quantized using the same characteristic as a characteristic of BT.1886, and a high-luminance part (area) is quantized using a coarse quantization step size. Then, the SDRTV dequantizes high code values as BT.1886 code values. That is, a high-luminance area of a hybrid HDR stream is automatically remapped to a luminance range of an SDR signal when video is displayed on the SDRTV.

As shown in FIG. 3, the hybrid OETF has the same curve as the BT.1886 OETF (SDR OETF) in a dark-part area with smaller luminance values than 50 nits (low-luminance area). That is, the hybrid OETF and the SDR OETF have a substantially equal relationship between luminance values and code values in the dark-part area. For example, the hybrid OETF is represented by following equation 1, which is described in, for example, the following document "White paper of BBC's EOTF (http://www.bbc.co.uk/rd/publications/whitepaper283)".

[Equation 1]

$$L = \begin{cases} V^{2S} & (0 \leq V \leq \xi) \\ \exp(S(V - \rho)/n) & (V > \xi) \end{cases} \quad (\text{式 1})$$

Note that equation 1 indicates that a range of V from 0 to ξ has the same relational expression as the BT.1886 OETF.

Now, with reference to FIGS. 4 and 5, a comparison is made between a PQ OETF and hybrid OETFs. In FIGS. 4 and 5, as an SDR OETF, a BT.1886 OETF is represented by a solid line, and as hybrid OETFs, a BBC OETF Lmax4 is represented by a dash-dotted line, a BBC OETF Lmax8 by a long-dashed line, and a PQ OETF by a short-dashed line. Note that the BBC OETF Lmax4 and Lmax8 are different from each other in that they are curves having different peak luminances, and are the same in that they have the same curve as the BT.1886 OETF in a dark-part area.

As shown in FIG. 4, in a case of a peak luminance of 1000 to 1200 nits, the PQ OETF cannot use an area with a code value (CV) of 750 or more. However, the BBC OETFs, both Lmax4 and Lmax8, can use all code values. That is, the hybrid OETFs can realize better image quality in a luminance range of 0 to 1000 nits.

In addition, as shown in FIG. 5, in an area with a code value of less than 400, the BT.1886 OETF and the BBC OETF Lmax4 and Lmax8 have substantially the same code values. That is, the hybrid OETFs can maintain image quality in a low-luminance area even when the SDRTV is used.

FIG. 6A is a diagram for describing a case of transmitting/distributing an HDR stream where luminance values are quantized using the PQ OETF, to the HDRTV and the SDRTV. FIG. 6B is a diagram for describing a case of transmitting/distributing an HDR stream where luminance values are quantized using a hybrid OETF, to the HDRTV and the SDRTV.

As shown in FIG. 6A, when the PQ OETF is used for generation of an HDR stream, upon playback of a BD a user needs to select an SDR disc or an HDR disc, according to a type of television (i.e., the SDRTV or HDRTV). On the other hand, as shown in FIG. 6B, when a hybrid OETF is used for generation of an HDR stream, the user does not need to know the type of television (i.e., the SDRTV or HDRTV), and just needs to use an HDR disc on which is recorded an HDR stream (hybrid stream) generated using the hybrid OETF, for playback.

Likewise, in so-called OTT services that distribute video streams over the Internet, distribution of hybrid streams which are quantized using hybrid OETFs can avoid user confusion.

Next, an OTT service will be described.

Figure 7:
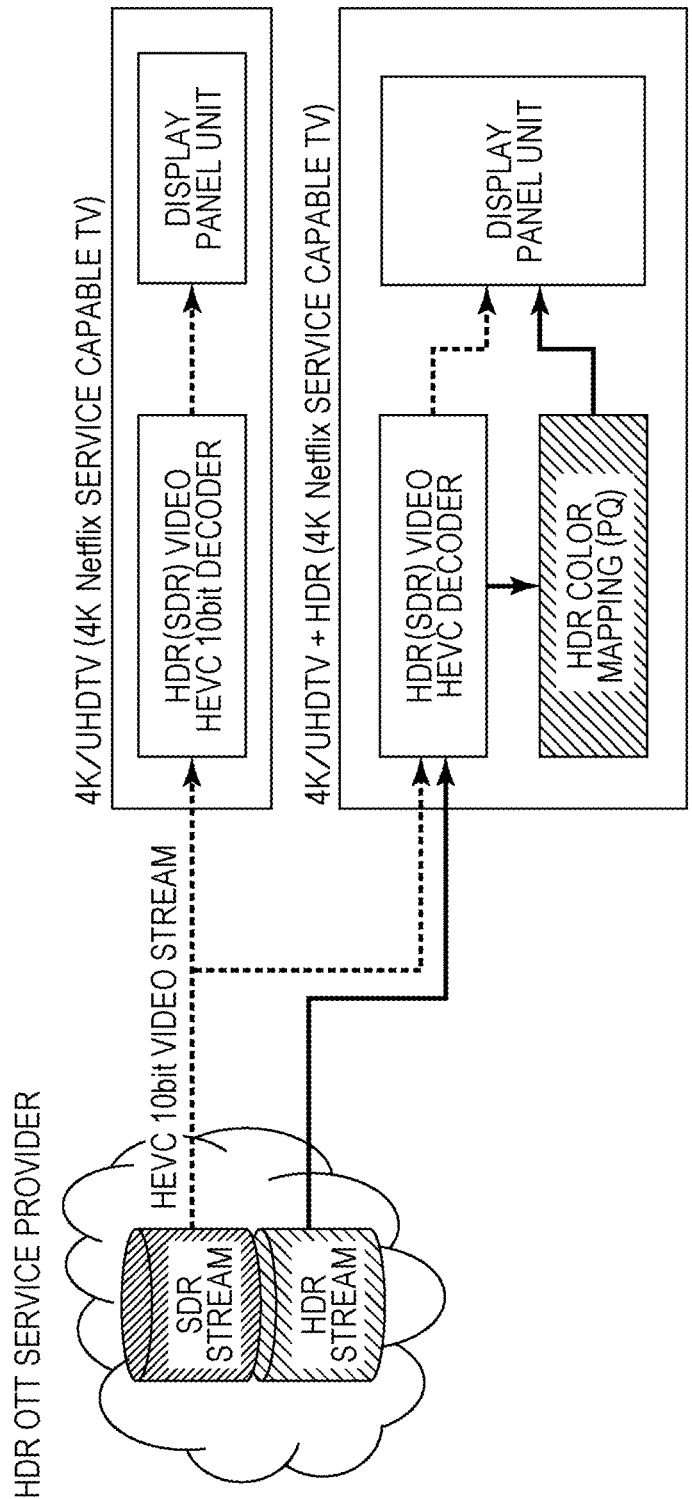
FIG. 7 is a diagram for describing a case of providing to TVs an SDR stream and an HDR stream which are transmitted from an OTT service.
Figure 8:
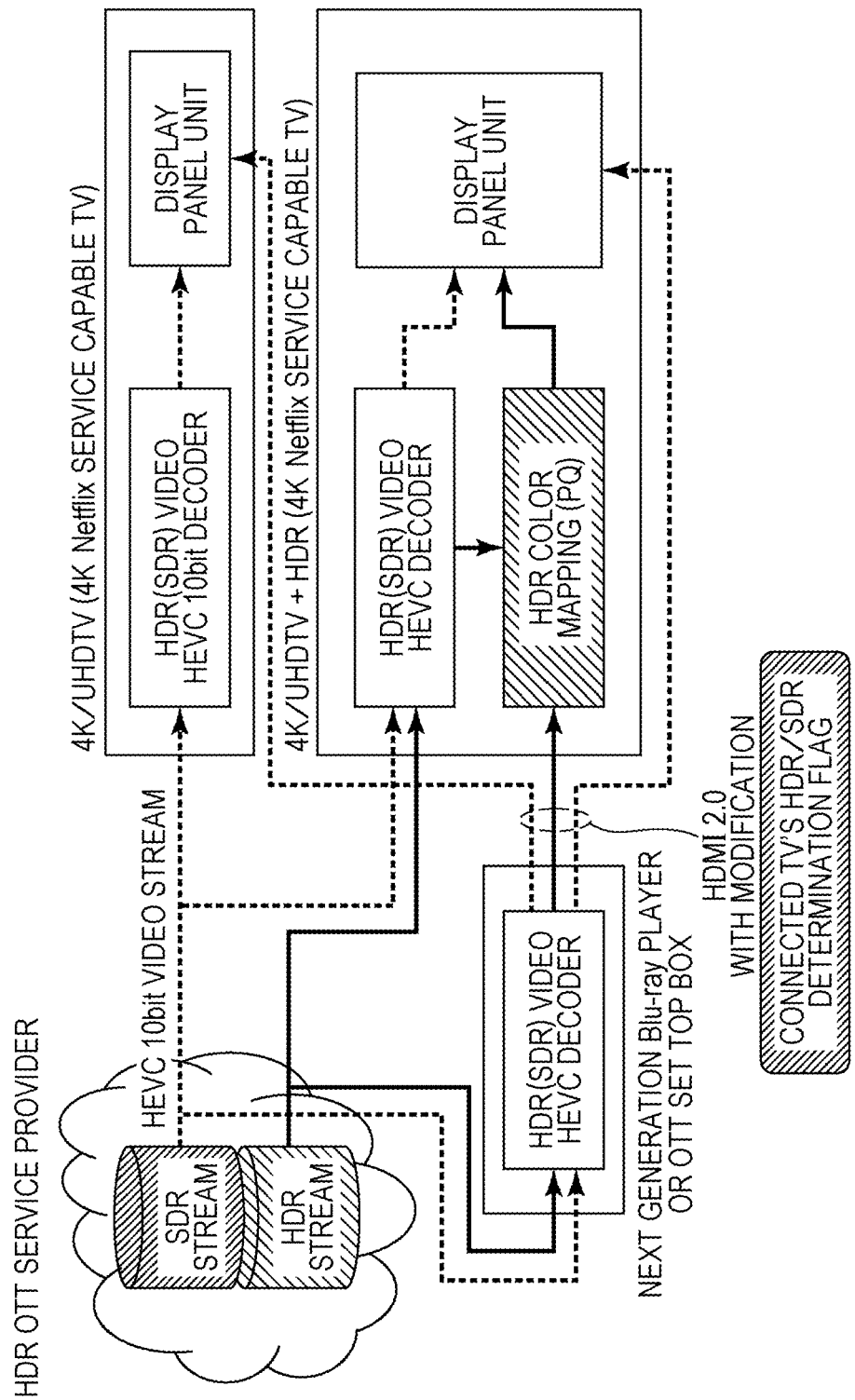
FIG. 8 is a diagram for describing a case of providing, through a Blu-ray device or an OTT STB, to TVs an SDR stream and an HDR stream which are transmitted from an OTT service.

FIG. 7 is a diagram for describing a case of providing to TVs an SDR stream and an HDR stream which are transmitted from an OTT service. FIG. 8 is a diagram for describing a case of providing, through a Blu-ray device or an OTT STB (set top box), to TVs an SDR stream and an HDR stream which are transmitted from an OTT service. Note that in FIG. 7 the SDRTV is represented as a 4K/UHDTV and the HDRTV is represented as a 4K/UHDTV+HDR. Note also that in FIG. 8 the SDRTV is represented as a 4KTV and the HDRTV is represented as a Next generation 4KTV.

As shown in FIG. 7, when an OTT service provider prepares two video streams, an SDR stream and an HDR stream, the OTT service provider determines whether a TV connected to the OTT service is the HDRTV. If the TV is the HDRTV, the OTT service provider provides only the HDR stream. Alternatively, if the TV is the HDRTV, the OTT service provider may provide a menu that allows a user to select either one of the HDR stream and the SDR stream. In the latter case, the OTT service provider provides a program for displaying the menu on the HDRTV, and when a selection of the HDR stream or the SDR stream is made by the user, the OTT service provider provides the selected video stream to the HDRTV.

On the other hand, if the TV connected to the OTT service is the SDRTV, the OTT service provider provides the SDR stream without providing the above-described menu. By this, the OTT service provider can hide presence of an HDR service from the user.

By this, the user can enjoy appropriate content suitable for a type (attribute) of TV without being conscious of the type (attribute) of TV owned by him/her or a type of content. In a case of FIG. 7, there is no difference in encoding/distributing system other than static HDR metadata processes.

Next, processes performed when the SDR stream and HDR stream transmitted from the OTT service are provided to the TVs will be described.

When the SDR stream is provided from the OTT service provider, the SDR stream is decoded by a video decoder of the SDRTV or the HDRTV, and decoded video is displayed on a display panel.

When the HDR stream is provided from the OTT service provider, the HDR stream is decoded by the video decoder of the HDRTV. Then, HDR color mapping is performed on a video signal obtained by the decoding, and the video signal is output to the display panel, by which video is displayed on the display panel.

In addition, when, as shown in FIG. 8, the SDR stream and HDR stream transmitted from the OTT service are provided to the TVs through the Blu-ray device (or OTT STB), the Blu-ray device obtains an attribute of a connected TV (HDRTV/SDRTV) via HDMI on OTT service software, and stores the obtained attribute of the TV in a "connected TV's HDR/SDR determination flag". The Blu-ray device may send the flag to a server of the OTT service to implement the same content selection as content selection performed by a direct service to the TV which is shown in FIG. 7.

Figure 9:
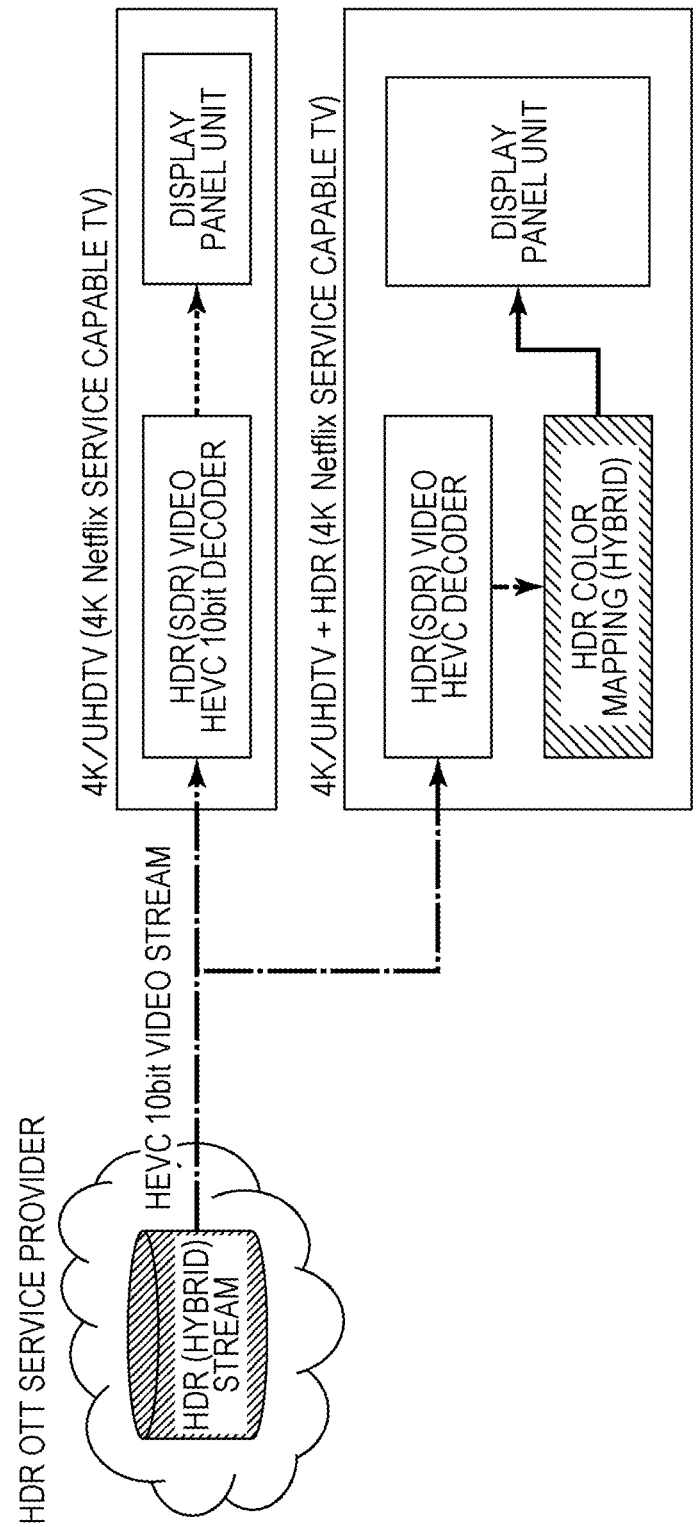
FIG. 9 is a diagram for describing a case of providing to TVs a hybrid stream transmitted from an OTT service.
Figure 10:
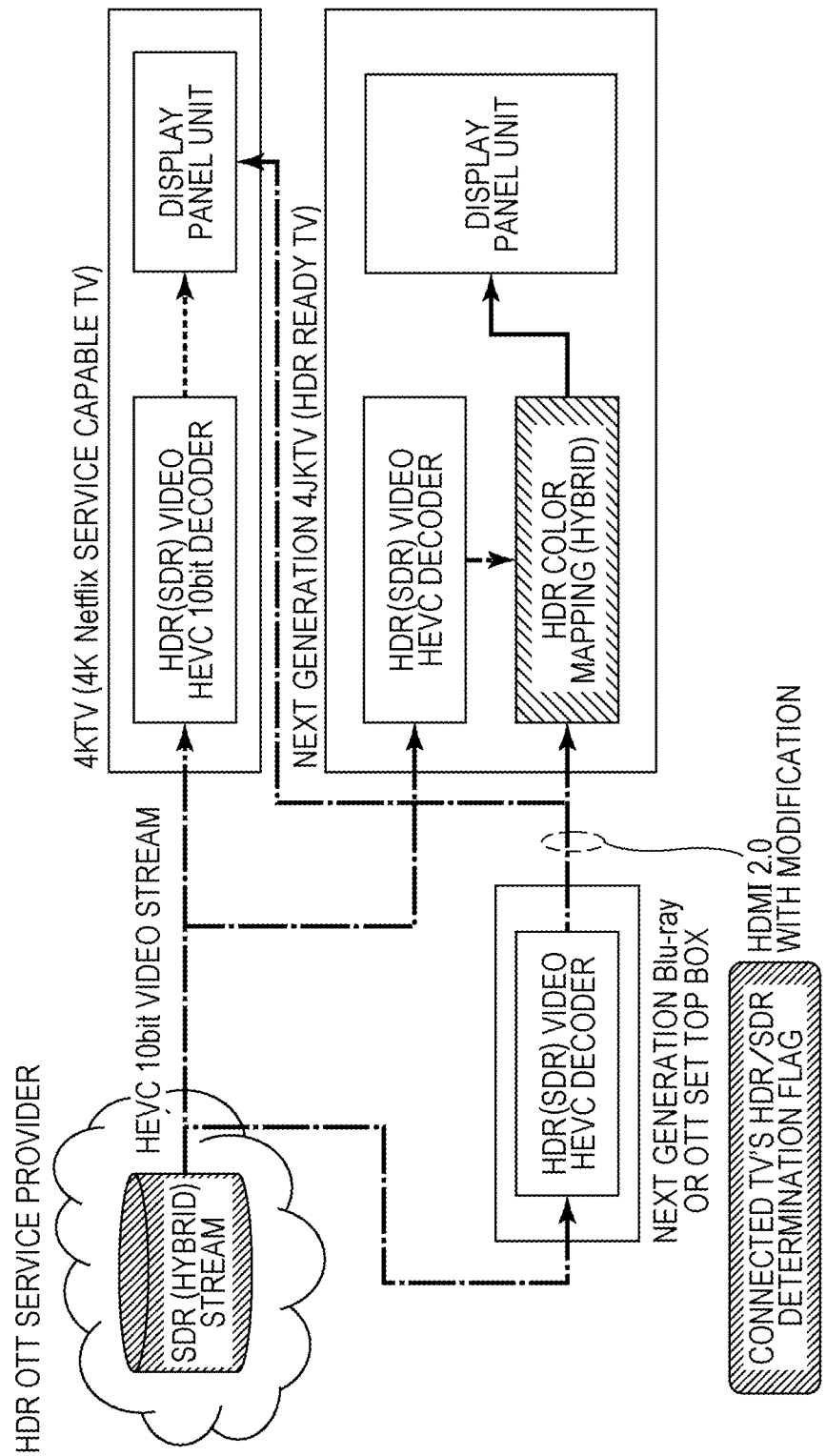
FIG. 10 is a diagram for describing a case of providing, through a Blu-ray device or an OTT STB, to TVs a hybrid stream transmitted from an OTT service.

FIG. 9 is a diagram for describing a case of providing to TVs a hybrid stream transmitted from an OTT service. FIG. 10 is a diagram for describing a case of providing, through a Blu-ray device or an OTT STB (set top box), to TVs a hybrid stream transmitted from an OTT service.

When a user considers viewing PQ content (i.e., an HDR stream obtained by performing quantization using the PQ OETF), the OTT service provider needs to determine whether a TV connected to the OTT service is the HDRTV. However, when content that the user wants to view is hybrid content (i.e., an HDR stream obtained by performing quantization using a hybrid OETF), there is no need to provide a distinction between HDR and SDR or to check an HDR/SDR attribute of a target TV to which a video stream is to be provided. That is, as shown in FIG. 9, the OTT service provider provides a hybrid stream regardless of a type of TV.

Note, however, that even if the content is hybrid content, viewing on the HDRTV allows the user to view content that reflects more content creator's intent, compared to viewing on the SDRTV. Hence, when an OTT service side has recognized the SDRTV, even if the content is hybrid content, a function of providing display to attract attention, such as the content is HDR content and thus it is better to view on the HDRTV, may be implemented on an OTT software module.

Note that in a case of FIG. 9, too, there is no difference in encoding/distributing system other than static HDR metadata processes.

Next, processes performed when the hybrid stream transmitted from the OTT service is provided to the TVs will be described.

In a case of providing a hybrid stream from the OTT service provider, when the hybrid stream is provided to the SDRTV, the hybrid stream is decoded by a video decoder of the SDRTV. A video signal obtained by the decoding is output as an SDR-supporting video signal to the SDRTV. The SDRTV displays video that is created based on the video signal received through HDMI, on a display panel.

When the hybrid stream is provided to the HDRTV, the hybrid stream is decoded by a video decoder of the HDRTV. HDR color mapping is performed on a video signal obtained by the decoding, and the video signal is output to a display panel, by which video is displayed on the display panel.

In addition, when, as shown in FIG. 10, a hybrid stream transmitted from the OTT service is provided to a TV through the Blu-ray device (or OTT STB), the Blu-ray device obtains an attribute of a connected TV (HDRTV/SDRTV) via HDMI on OTT service software, and stores the obtained attribute of the TV in a "connected TV's HDR/SDR determination flag". However, the Blu-ray device does not need to send the flag to a server of the OTT service. Hence, a determination as to whether content that a user wants to view is a hybrid stream or a PQ stream may be made and behavior may be changed accordingly.

As described above, when a connected display apparatus is the SDRTV, a reproduction apparatus such as a Blu-ray device determines whether an input video stream is quantized based on a hybrid OETF. If the reproduction apparatus determines that the video stream is quantized based on the hybrid OETF (in a case of FIG. 2, 6B, 9, or 10), the reproduction apparatus outputs a first reproduction signal obtained by performing reproduction of the video stream without performing luminance conversion on the video stream, the luminance conversion converting from HDR to SDR. If the reproduction apparatus determines that the video stream is not quantized based on the hybrid OETF (in a case of FIG. 1, 6A, 7, or 8), the reproduction apparatus outputs a second reproduction signal obtained by performing luminance conversion and reproduction on the video stream. Note that the input video stream may be a video stream obtained by reading a BD or may be a video stream obtained from an OTT service provider.

By this, regardless of a type of a video stream to be reproduced, the video stream can be displayed on a TV without a user being conscious of whether the video stream to be reproduced is a hybrid HDR stream or a PQ HDR stream. In addition, the video stream to be reproduced can be displayed on the TV without the user being conscious of whether a type of TV to display is the SDRTV or HDRTV. Hence, the user can appropriately display video on a display apparatus.

Next, an overview of HDR for next generation Blu-ray will be described.

Figure 11:
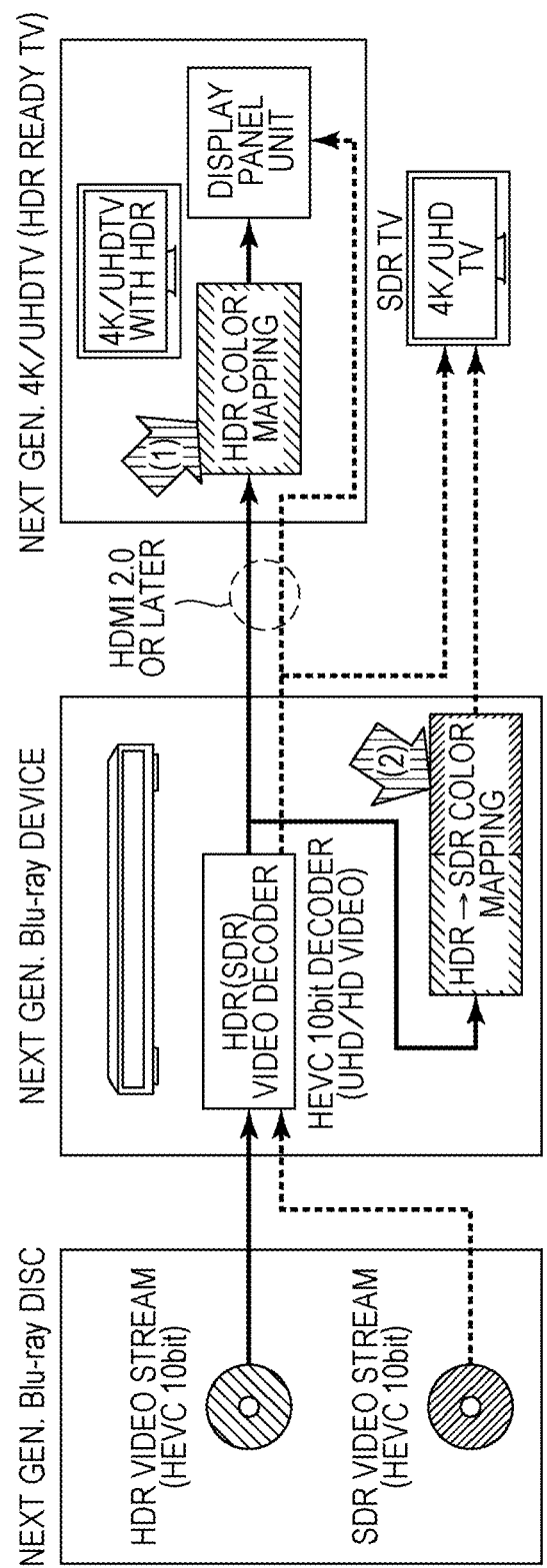
FIG. 11 is a diagram for describing an overview of HDR for next generation Blu-ray.

FIG. 11 is a diagram for describing an overview of HDR for next generation Blu-ray.

By using open-based HDR technologies as mandatory technologies, supporting of an HDR function of a 4K/UH-DTV and 4K/UHD Blu-ray does not require significant changes and thus development is facilitated. In addition, major TV manufacturers can develop HDRTVs by using their own technologies.

Meanwhile, matters concerned by a content creator include HDR image quality of the HDRTV (a result of a process indicated by arrow 1 of FIG. 11) and image quality after HDR-to-SDR conversion by a Blu-ray player (a result of a process indicated by arrow 2 of FIG. 11).

Figure 12:
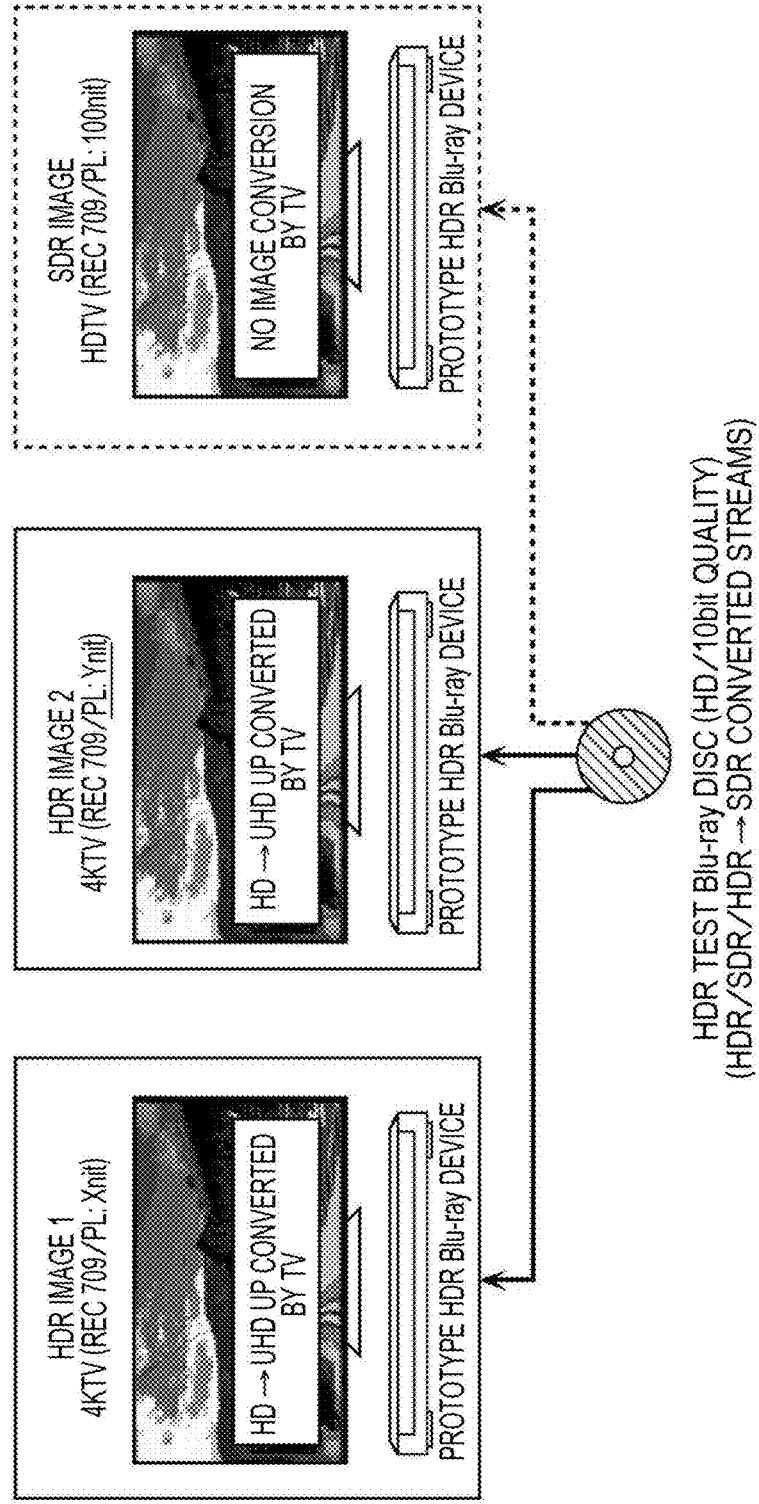
FIG. 12 is a diagram for describing an example of open-based HDR technologies.

FIG. 12 is a diagram for describing an example of the open-based HDR technologies.

As shown in FIG. 12, when an HDR stream obtained by playing a BD is output, for HDR image quality (high-end consumer 4K/UHDTV), there are HDR image 1 with a peak luminance of about 300 nits to 500 nits (X [nit]) and HDR image 2 with a peak luminance of about 600 nits to 1000 nits (Y [nit]).

Figure 13:
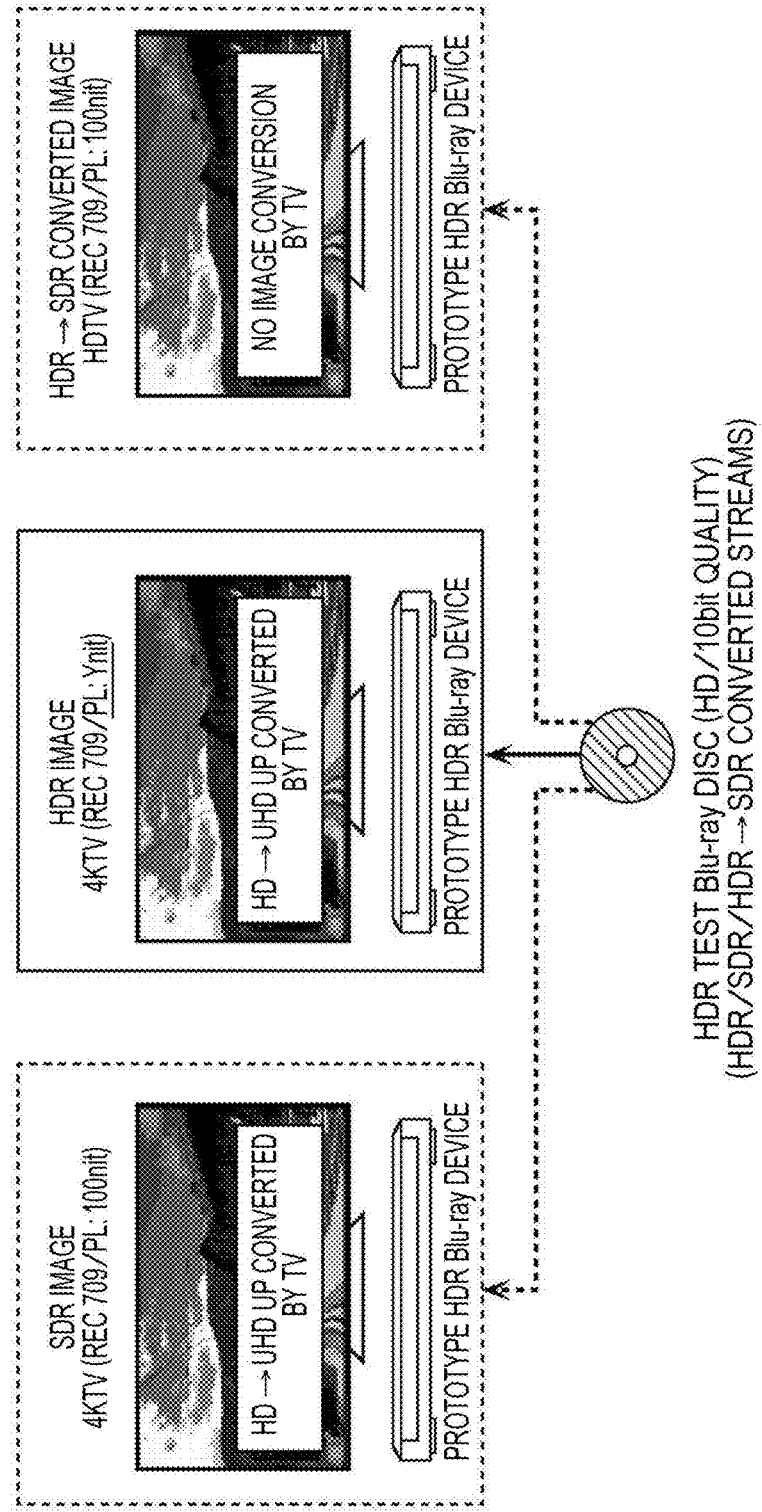
FIG. 13 is a diagram for describing another example of the open-based HDR technologies.

FIG. 13 is a diagram for describing another example of the open-based HDR technologies.

As shown in FIG. 13, when an HDR stream obtained by playing a BD is output, for image quality after HDR-to-SDR conversion (high-end consumer HDTV), there are a linear base and a gamma base.

FIG. 14 is a table showing an example of HDR master specifications (mandatory part).

As shown in FIG. 14, in the example of HDR master specifications, color space is YCbCr BT.2020 (non constant luminance). Gradation (bits) is 10 bits. EOTF is an SMPTE 2084 EOTF (10 bits). Maximum/minimum luminances of static metadata (max/min luminance (static)) are mastering display color volume SEI message of HEVC (MPEG adoption of SMPTE 2086 carriage), Title by Title.

For an example of a method for implementing HDR color mapping on a TV, a hybrid EOTF is added as an additional EOTF (mandatory for an apparatus and optional for a disc), with a peak luminance of 1000 nits. By this, in a hybrid EOTF case, a CP (Contents Provider) does not need to add an SDR stream.

Figure 15:
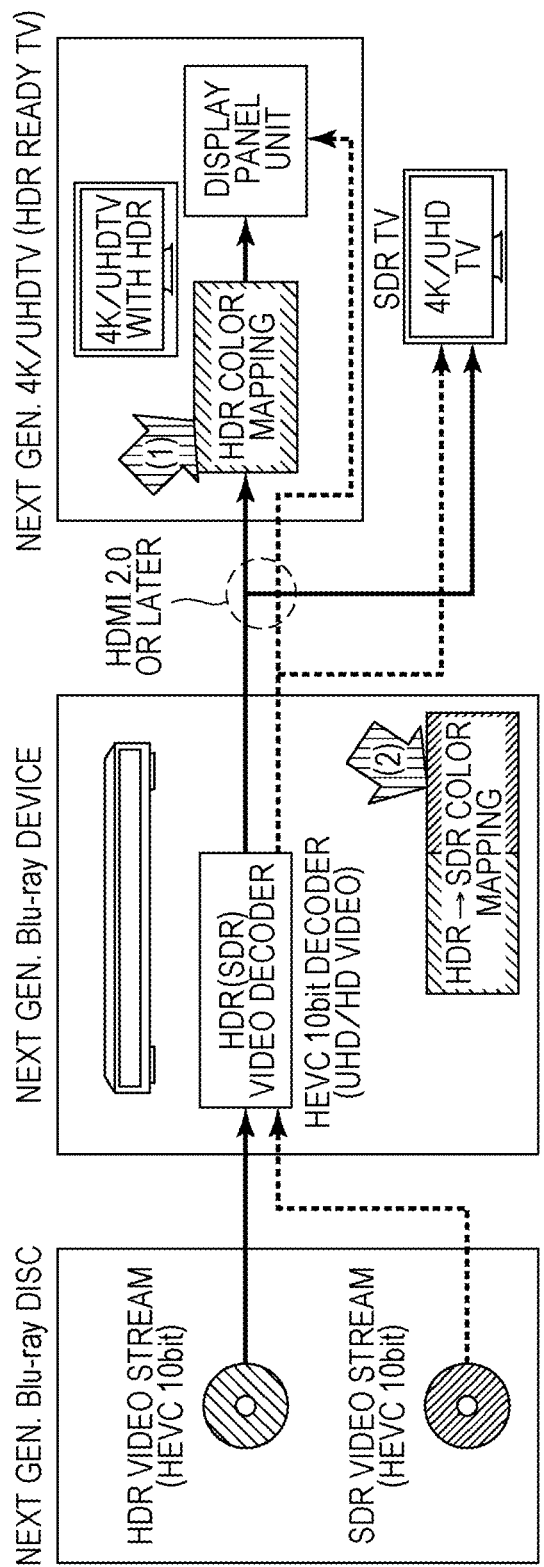
FIG. 15 is a schematic diagram showing another example of content of processes performed by the Blu-ray device in a manner appropriate to various types of BDs and various types of display apparatuses.

FIG. 15 is a schematic diagram showing another example of content of processes performed by the Blu-ray device in a manner appropriate to various types of BDs and various types of display apparatuses.

A case in which a hybrid EOTF is used for HDR content is considered.

Upon content creation, as shown in FIG. 15, the Blu-ray device does not perform luminance conversion from HDR to SDR, and thus, there is no need to concern about image quality after HDR-to-SDR conversion on a Blu-ray device. Note, however, that color space conversion (conversion from BT.2020 to BT.709) is required as a stream is still an HDR stream. Resolution down-conversion (conversion from 4K/UHD to HD) is required as the stream is still a 4K/UHD stream.

Upon content creation, there is no need to prepare an SDR stream for an HDR disc. Upon content creation, even if a user uses the SDRTV, HDR image quality can be checked.

FIG. 16 is a table showing HDR master specifications (mandatory part) proposed by the present inventors.

As shown in FIG. 16, in the HDR master specifications, color space is YCbCr BT.2020 (non constant luminance). Gradation (bits) is 10 bits. EOTF is an SMPTE 2084 EOTF (10 bits) and BBC (Lmax8). Peak luminance is 1000 nits (4000 nits as an option). Static metadata includes maximum/minimum luminances (max/min luminance (static)) and mastering display color volume SEI message (MPEG adoption of SMPTE 2086 carriage) in an HEVC standard. The static metadata is fixed on a title-by-title basis. In addition, dynamic metadata is not used.

Figure 17:
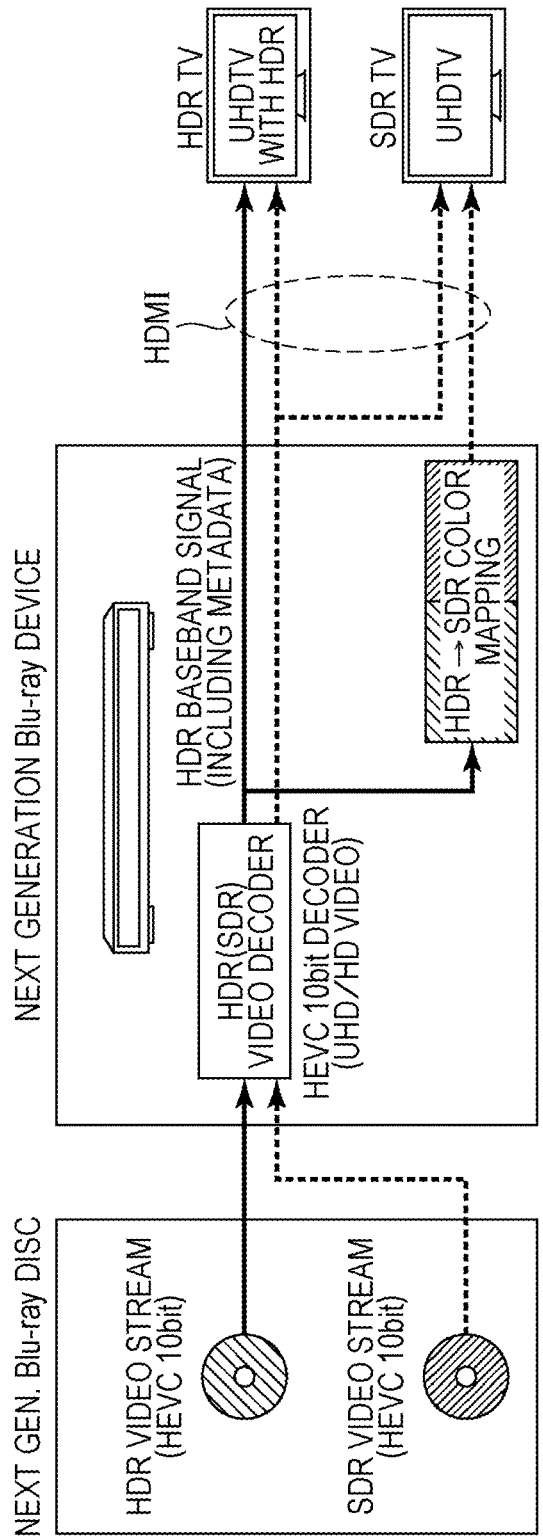
FIG. 17 is a schematic diagram showing another example of content of processes performed by the Blu-ray device in a manner appropriate to various types of BDs and various types of display apparatuses.

FIG. 17 is a schematic diagram showing another example of content of processes performed by the Blu-ray device in a manner appropriate to various types of BDs and various types of display apparatuses. As shown in FIG. 17, the Blu-ray device and the HDRTV or SDRTV may be connected to each other by HDMI.

(Reference Information)

Figure 18:
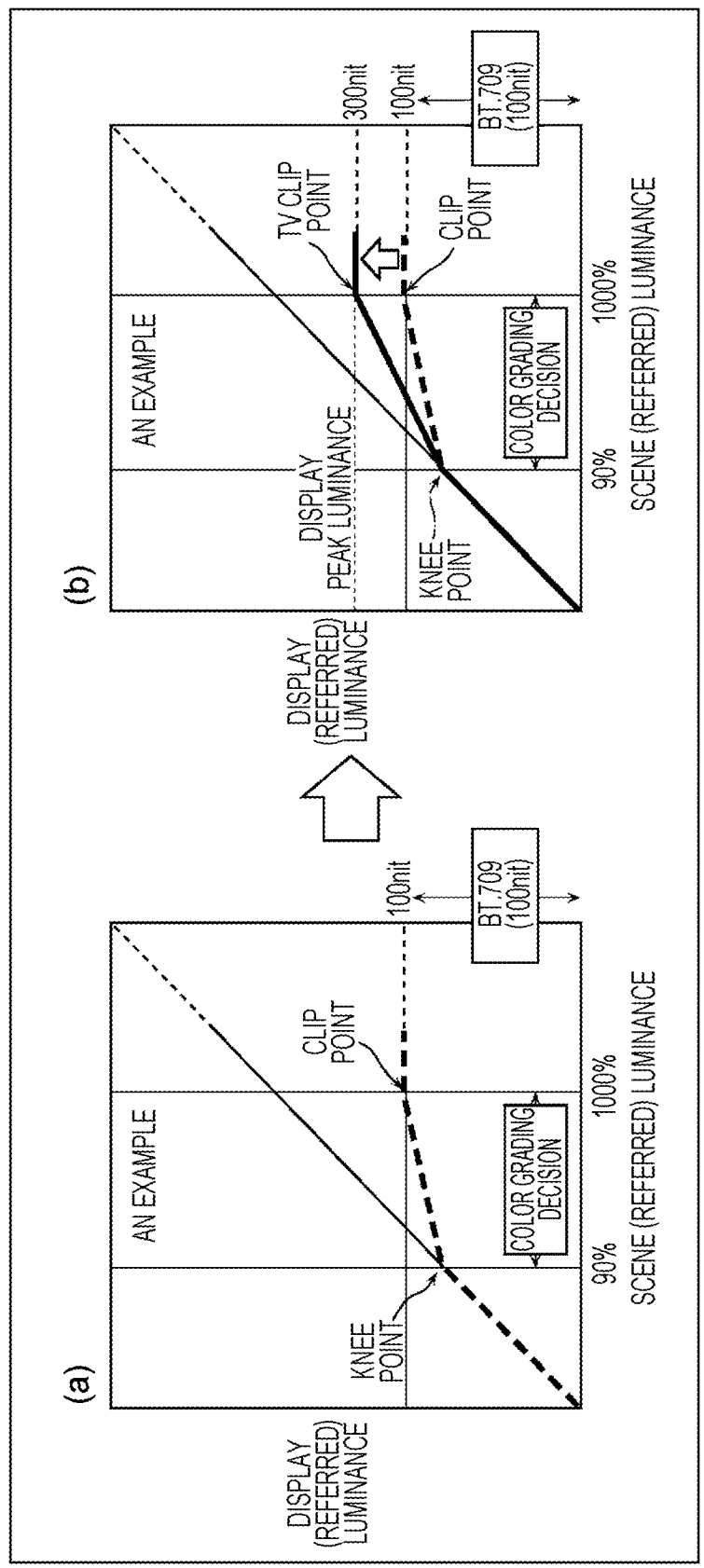
FIG. 18 is graphs describing luminance conversion on an SDRTV.

FIG. 18 is graphs describing luminance conversion on the SDRTV. (a) of FIG. 18 is a diagram showing a conversion process where a dynamic range of an HDR stream is converted to SDR with a peak luminance of 100 nits. (b) of FIG. 18 is a diagram showing a conversion process where a dynamic range of an HDR stream is converted to a luminance range displayable on an SDRTV with a peak luminance of 300 nits.

Some SDRTVs have a capability of reproducing an image with a peak luminance of more than 100 (e.g., display peak luminance ranges from 200 nits to 300 nits). Hence, on such SDRTVs, by performing luminance conversion such as that shown in (b) of FIG. 18 instead of luminance conversion shown in (a) of FIG. 18 by using a TV display capability, a brighter image (e.g., 300 nit peak) than an image of BT.709 (100 nit peak) can be reproduced. That is, each SDRTV has its own image reproduction and enhancement algorithm.

Specifically, the SDRTV performs, as shown in FIG. 18, luminance conversion where a linear signal (HDR luminance values) is converted to a dynamic range of an HDR stream in accordance with luminances displayable on the TV. In the luminance conversion, an HDR luminance value (input luminance value) is converted to a display luminance value (output luminance value) that does not exceed a display peak luminance (DPL). The DPL is a peak luminance of the SDRTV (e.g., 300 nits).

Here, a knee point and a clip point indicate points where characteristics of a luminance value corresponding to a code value in an EOTF and a luminance value displayed on a display apparatus change. Specifically, the knee point and the clip point indicate change points where an increase in luminance value displayed in practice with respect to a luminance of a video signal represented by the EOTF has a value different than 1:1. For example, the knee point is information for identifying a point of the EOTF that deviates from a linear change. In addition, the clip point indicates a point where clipping of a luminance value starts upon display. Here, the clipping refers to conversion of input luminance values greater than or equal to a certain value to the same output luminance value.

Figure 19:
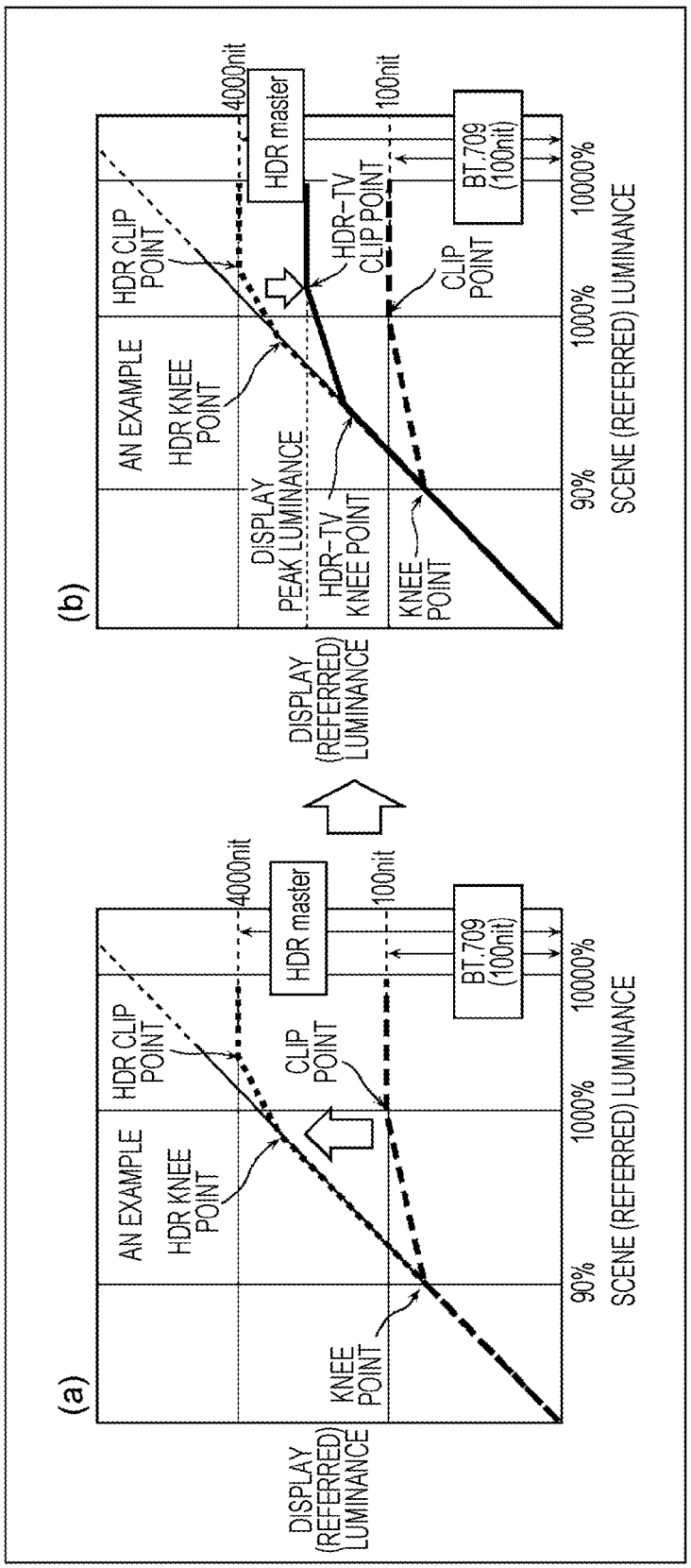
FIG. 19 is graphs describing luminance conversion on an HDRTV.

FIG. 19 is graphs describing luminance conversion on the HDRTV. (a) of FIG. 19 is a diagram showing a conversion process where a dynamic range of an HDR master is converted to an HDR luminance range with a peak luminance of 4000 nits. (b) of FIG. 19 is a diagram showing a conversion process where a dynamic range of an HDR master is converted to a luminance range displayable on an HDRTV with a peak luminance of, for example, 1000 nits.

The HDR master can have a larger headroom (high-luminance area: for example, a luminance area of more than 100 nits, such as 4000 nits) than an HD master (SDR master). HDRTVs may have a high display peak luminance (e.g., 1000 nits), but a peak luminance of the HDR master is much higher than a display peak luminance of the HDRTVs. The HDRTVs can reproduce an HDR image (e.g., 1000 nit peak) which is smaller than HDR content (4000 nit peak), by using an HDRTV capability. Each HDRTV has its own image reproduction and enhancement algorithm.

Specifically, the HDRTV performs, as shown in FIG. 19, luminance conversion where a linear signal (luminance values of an HDR master) is converted to a dynamic range of an HDR stream in accordance with luminances displayable on the TV. In the luminance conversion, an HDR luminance value (input luminance value) is converted to a display luminance value (output luminance value) that does not exceed a display peak luminance (DPL). The DPL is a peak luminance of the HDRTV (e.g., 1000 nits).

Note that in the above-described exemplary embodiments, each component may be composed of dedicated hardware or may be implemented by executing a software program suitable for the component. Each component may be implemented by a program executor, such as a CPU or a processor, reading and executing a software program which is recorded in a recording medium such as a hard disk or a semiconductor memory.

Although a display method and a display apparatus according to one or a plurality of aspects of the present disclosure are described above based on the exemplary embodiment, the present disclosure is not limited to the exemplary embodiment. A mode where various modifications that come up with by a person skilled in the art are made to the exemplary embodiment, a mode formed by combining together components of different exemplary embodiments, etc., may also be included in a range of the one or plurality of aspects of the present disclosure without departing from the spirit and scope of the present disclosure.

The present disclosure is useful as, for example, a reproduction method capable of appropriately displaying video on a display apparatus.

What is claimed is:

1. A display apparatus for displaying video based on a reproduction signal obtained from a video stream,
   the video stream having a first dynamic range where a maximum value of a luminance dynamic range is more than a predetermined luminance value,
   the display apparatus configured to display video in a second dynamic range narrower than the first dynamic range,
   the display apparatus comprising:
      a receiver that receives one of a first reproduction signal or a second reproduction signal; and
      a display that displays video based on the received one of the first reproduction signal or the second reproduction signal,
   wherein the first reproduction signal is obtained by one of:
      reproducing a first video stream quantized based on a hybrid optical-electro transfer function (OETF) without performing luminance conversion from the first dynamic range into the second dynamic range on a luminance of the first video stream; or
      performing the luminance conversion on the luminance of the first video stream and reproducing the first video stream subjected to the luminance conversion, and
   the second reproduction signal is obtained by performing the luminance conversion on a luminance of a second video stream not quantized based on the hybrid OETF and reproducing the second video stream subjected to the luminance conversion.

2. The display apparatus according to claim 1, wherein the predetermined luminance value is 100 nits.

3. A display method for a display apparatus that displays video based on a reproduction signal obtained from a video stream,
   the video stream having a first dynamic range where a maximum value of a luminance dynamic range is more than a predetermined luminance value,
   the display apparatus being configured to display video in a second dynamic range narrower than the first dynamic range,
   the display method comprising:
      receiving one of a first reproduction signal or a second reproduction signal; and
      displaying video based on the received one of the first reproduction signal or the second reproduction signal,
   wherein the first reproduction signal is obtained by one of:
      reproducing a first video stream quantized based on a hybrid optical-electro transfer function (OETF) without performing luminance conversion from the first dynamic range into the second dynamic range on a luminance of the first video stream; or
      performing the luminance conversion on the luminance of the first video stream and reproducing the first video stream subjected to the luminance conversion, and
   the second reproduction signal is obtained by performing the luminance conversion on a luminance of a second video stream not quantized based on the hybrid OETF and reproducing the second video stream subjected to the luminance conversion.

4. A reproduction and display system, comprising:
   a reproduction apparatus that reproduces a video stream and outputs a reproduction signal obtained from the reproduced video stream; and
   a display apparatus that displays video based on the reproduction signal,
   wherein the video stream has a first dynamic range where a maximum value of a luminance dynamic range is more than a maximum value of a second dynamic range,
   the reproduction apparatus includes a processor that determines whether the video stream is quantized based on a hybrid optical-electro transfer function (OETF),
   the processor outputs, when determining that the video stream is quantized based on the hybrid OETF, a first reproduction signal obtained by one of:
      reproducing the video stream without performing luminance conversion from the first dynamic range into the second dynamic range on a luminance of the video stream; or
      performing the luminance conversion on the luminance of the video stream,
   the processor outputs, when determining that the video stream is not quantized based on the hybrid OETF, a second reproduction signal obtained by performing the luminance conversion on the luminance of the video stream,
   the display apparatus displays video in the second dynamic range, and
   the display apparatus includes a display that displays video based on the first reproduction signal or the second reproduction signal.

* * * * *